(12) United States Patent
Holloway et al.

(10) Patent No.: US 8,570,179 B2
(45) Date of Patent: Oct. 29, 2013

(54) INTEGRATED CONDITION OR ACTUATION MONITORING AND CONTROL COMPONENT FOR SWITCHES, CIRCUIT BREAKERS, PANEL BOARDS, AND OTHER ITEMS FOR ELECTRICAL CONTROL AND CIRCUIT PROTECTION

(75) Inventors: David Carr Holloway, Baldwinsville, NY (US); Kerop D. Janoyan, Potsdam, NY (US); Matthew J. Whelan, Fayetteville, NY (US)

(73) Assignee: Cooper Technologies Company, Houston, TX (US)

( * ) Notice: Subject to any disclaimer, the term of this patent is extended or adjusted under 35 U.S.C. 154(b) by 368 days.

(21) Appl. No.: 13/063,916

(22) PCT Filed: Sep. 15, 2009

(86) PCT No.: PCT/US2009/056936
§ 371 (c)(1),
(2), (4) Date: Mar. 14, 2011

(87) PCT Pub. No.: WO2010/031037
PCT Pub. Date: Mar. 18, 2010

(65) Prior Publication Data
US 2011/0169650 A1     Jul. 14, 2011

Related U.S. Application Data

(60) Provisional application No. 61/096,982, filed on Sep. 15, 2008.

(51) Int. Cl.
*G08B 21/00*        (2006.01)

(52) U.S. Cl.
USPC .................. 340/635; 340/539.22; 340/539.26

(58) Field of Classification Search
USPC ............ 340/539.1, 539.22, 539.26, 618, 635, 340/653, 665, 870.11, 870.16; 361/699
See application file for complete search history.

(56) References Cited

U.S. PATENT DOCUMENTS

| 4,216,658 | A | | 8/1980 | Baker, III et al. |
|---|---|---|---|---|
| 4,704,607 | A | | 11/1987 | Teather et al. |
| 5,656,996 | A | * | 8/1997 | Houser ......................... 340/541 |
| 5,659,302 | A | * | 8/1997 | Cordier .................... 340/870.11 |
| 5,907,473 | A | | 5/1999 | Przilas et al. |
| 6,339,373 | B1 | | 1/2002 | Zeskind et al. |
| 6,975,237 | B2 | | 12/2005 | Barton et al. |
| 7,221,282 | B1 | | 5/2007 | Ross et al. |

* cited by examiner

*Primary Examiner* — Van T. Trieu
(74) *Attorney, Agent, or Firm* — King & Spalding LLP (57) ABSTRACT

A sensor is coupled to a device positioned within an enclosure and is configured to determine the status of the device or its surrounding environment. The sensor transmits the information to a central computer and/or a local indicator. Once the information is received at the central computer, the information is processed for the operators and maintainers to interpret. Based on the information received, the operators and maintainers may implement procedures to maintain the device or its surrounding environment under observation. In certain embodiments, the central computer provides instructions to a second device within or adjacent to the enclosure to implement corrective actions. In some embodiments, the sensor is coupled to a microcontroller which performs analysis received from the sensor and provides instructions to the second device to implement corrective actions.

19 Claims, 4 Drawing Sheets

INTEGRATED CONDITION OR ACTUATION MONITORING AND CONTROL COMPONENT FOR SWITCHES, CIRCUIT BREAKERS, PANEL BOARDS, AND OTHER ITEMS FOR ELECTRICAL CONTROL AND CIRCUIT PROTECTION

CROSS-REFERENCE TO RELATED APPLICATIONS

This application claims priority to and is a national phase application of application number PCT/US2009/56935 filed Sep. 15, 2009 and titled "Integrated Condition Or Actuation Monitoring And Control Component For Switches, Circuit Breakers, Panel Boards, And Other Items For Electrical Control And Circuit Protection" which claims the benefit of U.S. Provisional Patent Application No. 61/096,982, entitled "Integrated Condition or Actuation Monitoring and Control Component for Switches, Circuit Breakers, Panel Boards, and Other Items for Electrical Control and Circuit Protection," filed Sep. 15, 2008, the entirety of which is incorporated by reference herein.

TECHNICAL FIELD

The disclosed apparatus relates generally to monitoring electrical components. More particularly, this invention relates to remote monitoring of electrical components and/or the surrounding environment in which the electrical components are disposed.

BACKGROUND

Switches, protective devices, and other components change state when certain conditions occur. These state changes include, but are not limited to, the tripping of the component, operational to non-operational function of the component, and non-operation to operational function of the component. These state changes are usually apparent to a person directly observing the components but are unnoticed by others until the component is directly observed. While the components operate to prevent potentially harmful situations, the failure to acknowledge and reset the components can lead to other hazardous consequences, such as harm to equipment and/or personnel. Many of these components can be critical to plant operation and personnel safety. If the component state change is not detected for a period of time, the process of resetting the component can become expensive and time consuming. At times, the component can be damaged thereby requiring replacement of the component.

Additionally, the operation of switches, protective devices, and other components can be affected when the surrounding environment in which the components are disposed changes. For example, if the components are disposed in an enclosure and the humidity of the components' surrounding environment increases beyond a certain threshold, the components may not operate as intended. Typically, these conditions of the components' surrounding environment are usually apparent to a person when the person opens the enclosure. These conditions are typically not noticed by others until they open the enclosure and observe the components' surrounding environment. While the components operate to prevent potentially harmful situations, the failure to acknowledge and adjust the components' surrounding environment can lead to other hazardous consequences, such as harm to equipment and/or personnel. Many of these components can be critical to plant operation and personnel safety. If the change in the components' surrounding environment is not detected for a period of time, the components can be damaged and not operate as intended. Expensive equipment that the components protect also can become damaged. Additionally, replacement of the components can become expensive and time consuming.

Therefore, a need exists for remotely monitoring the status of electrical components and/or the surrounding environment in which the electrical components are disposed.

SUMMARY

The disclosed system and method relate generally to observation and activation of components remotely. More particularly, the disclosed apparatus relates to a system that can determine the status of a component and/or the surrounding environment of the component and signal that information to a central location. In certain aspects, the system also can actuate a device to change the status of the component or the surrounding environment of the component.

According to one exemplary aspect, a sensor is coupled to a component. The sensor determines the status of the component and transmits the information to a repeater unit which communicates with a central location. Alternatively, the sensor may directly communicate with the central location. Once the info illation is received at the central location, the information is processed for the operators. Based on the information received, the operators may implement procedures to maintain the system.

These and other aspects, objects, features, and embodiments of the present disclosure will become apparent to those having ordinary skill in the art upon consideration of the following detailed description of illustrative embodiments exemplifying the best mode for carrying out the apparatus as presently perceived.

DETAILED DESCRIPTION OF THE INVENTION

The disclosed system and method may be better understood by reading the following description of non-limiting exemplary embodiments with reference to the attached drawings, wherein like parts in each of the figures are identified by the same reference characters.

Figure 1:
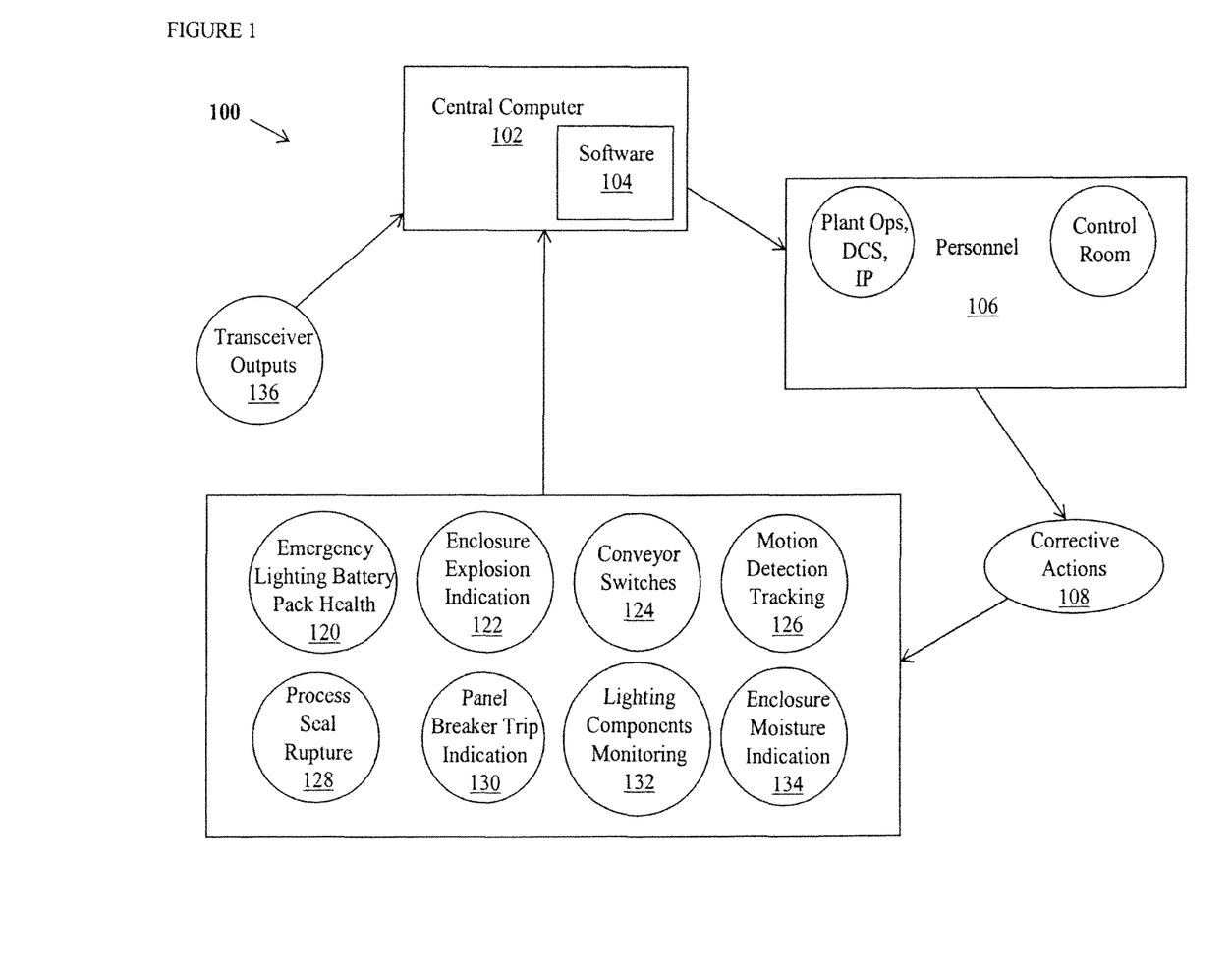
FIG. 1 is a block diagram depicting a system for monitoring and controlling component state and/or component surrounding environment using multiple forms of sensor input according to an exemplary embodiment.

FIG. 1 is a block diagram depicting a system 100 for monitoring and controlling component state and/or component surrounding environment using multiple forms of sensor input according to an exemplary embodiment. The disclosed system and method allow a switch, protective device, or other component to be monitored remotely by sensors 120-134 that transmit information to a central monitoring system, such as a central computer 102. According to the exemplary embodiment, the sensors 120-134 include one or more of the following sensors: an emergency lighting battery pack health sensor 120, an enclosure explosion indication sensor 122, an AFU/AFA conveyor switch sensor 124, a motion detection tracking sensor 126, a process seal rupture sensor 128, a panel or individual breaker trip indication sensor 130, a lighting components monitoring VMV/EVM sensor 132, and an enclosure moisture indication sensor 134. In alternative exemplary embodiments, other types of sensors capable of monitoring an electrical component, such as a temperature sensor, a voltage sensor, and a current sensor, can be used in lieu of or in addition to the aforementioned sensors. In exemplary embodiments, the central computer 102 can include, but is not limited to, a personal computer, a laptop computer, and/or a personal data assistant ("PDA") that can be held by one or more personnel. Typically, the central computer 102 is located some distance away from the sensors 120-134 so that the sensors 120-134 are not observable to a person standing near the central computer 102.

Once the information has been transmitted to the central computer 102, the information is analyzed by software 104 that is accessible by the central computer 102. The software 104 either resides within the central computer 102 or is on a network coupled to the central computer 104. The software 104 analyzes the information and determines whether the component and/or its surrounding environment is operating normally, the component and/or its surrounding environment is about to operate abnormally, or the component and/or its surrounding environment is operating improperly and needs maintenance. The software 104 then communicates the analyzed information to personnel 106. The software 104 provides the information to the personnel 106 using a display at the central monitoring system and/or using a network (not illustrated), such as an intranet, a control system, or the Internet, wherein the personnel 106 can access the information on the network from any suitable location. Thus, personnel 106 can obtain the analyzed information no matter where they are physically located.

Once personnel 106 receives the analyzed information, personnel 106 can take corrective actions 108, including, but not limited to, performing no action, replacing the component, installing a new additional component, making adjustments to the component, or making corrections to the component's surrounding environment, if necessary. Additionally, the system 100 can receive information from outside transmitter/transceiver outputs 136. The system 100 additionally provides local indications at the sensor 120-134 locations without the need for personnel to open the enclosure containing the component and the sensor, with provisions for sending a signal via wired contacts or wireless circuit to a pilot light, an alarm, and/or a control room. Additionally, according to some exemplary embodiments, the central computer 102 can communicate instructions to control or actuate one or more of the components being monitored by the sensors 120-134 and/or control or actuate one or more of the devices used to control the environment surrounding the one or more components being monitored by the sensors 120-134. The sensors 120-134 will be described in further detail hereinafter.

Figure 2A:
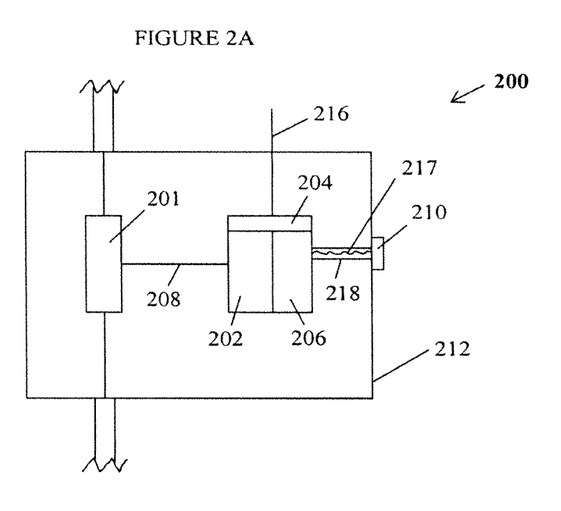
FIG. 2A is a block diagram depicting a sensor system according to an exemplary embodiment for monitoring and controlling an electrical component.

FIG. 2A is a block diagram depicting a sensor system 200 according to an exemplary embodiment for monitoring and controlling an electrical component 201. Several elements may be common to the various embodiments of the sensor system 200. The sensor system 200 may include one or more of the following: sensor(s) 202, a transmitter or transceiver 204 (hereinafter referred to as a "transceiver 204"), an antenna 216, a local indicator 210, a microcontroller 206, communications ports (not illustrated), and a power supply (not illustrated). Each of the listed items may be provided within or coupled exteriorly to an enclosure 212.

In operation of one exemplary embodiment, the sensor 202 detects or receives state information from the component 201 via a hardwire 208 and communicates the state information to the microcontroller 206. Although the state information is provided from the component 201 to the sensor 202 using a hardwire 208, state information can be provided from the component 201 to the sensor 202 using any method known to persons having ordinary skill in the art. For example, state information can be transmitted from the component 201 to the sensor 202 using mechanical means, electrical means, and/or optical means. The microcontroller 206 can process the state information and activate the local indicator 210 via a wired connection 217 proceeding through a connector 218. The connector 218 provides a passageway from the interior of the enclosure 212 to the exterior of the enclosure 212. The local indicator 210 provides a local indication on the outside of the enclosure 212 regarding the state of the component 201. The local indicator 210 can provide different types of status indication ranging from normal operation, to potential start of abnormal conditions, to current abnormal conditions, to failure of component 201. For example, if the component 201 is a circuit breaker, the local indicator 210 could be a red light that indicates the circuit breaker has opened or a green light to indicate the circuit breaker is currently closed. In another example, the local indicator 210 can indicate a green light to indicate normal environmental conditions, yellow light to indicate high humidity environmental conditions, and a red light to indicate accumulation of condensation in the surrounding environment. Although different colored lights are provided as an example for local indicator 210, the local indicator 210 can be any visible indication change or an audible change. For example, the local indicator 210 can be an alarm, wherein the alarm is silent if the circuit breaker remains closed and becomes audible if the circuit breaker opens. The microcontroller 206 also communicates the state information to the transceiver 204, which wirelessly transmits the state information to the central computer 102 via the antenna 216.

According to some exemplary embodiments, the central computer 102 can wirelessly communicate a control signal that the transceiver 204 receives via the antenna 216. The transceiver 204 communicates the control signal to the microcontroller 206, which may then communicate the control signal to component 201. In response, component 201 can activate as instructed in the control signal. For example, if the component 201 is a circuit breaker, the control signal can activate a motor of the circuit breaker which will operate to re-close the circuit breaker. In alternative exemplary embodiments, the microcontroller 206 can communicate the control signal to an alternative device, which may be located within the enclosure 212. In response, the alternative device can activate as instructed in the control signal. For example, if the humidity level is increasing within the enclosure 212, the microcontroller 206 may communicate the control signal to a heater, which can turn on to reduce the humidity level within the enclosure 212. Thus, the central computer 102 can wirelessly communicate instructions to activate and/or control the component 201 and/or control the component's 201 surrounding environment.

In another alternative exemplary embodiment, the sensor 202 can activate the local indicator 210 and also can communicate the state information directly to the transceiver 204, which wirelessly transmits the state information to the central computer 102 via the antenna 216. In this alternative exemplary embodiment, the microcontroller 206 is not needed to perform control and/or analysis functions.

Various forms of communication architecture may be utilized to have sensors 202 communicate to the central computer 102 remotely. Some sensors 202 may communicate directly with the central computer 102 via the microcontroller 206, the transceiver 204, and/or the antenna 216. Other sensors may communicate with a repeater station 304 (FIG. 3), where the repeater station 304 (FIG. 3) communicates with the central computer 102, as described hereinafter with reference to FIG. 3.

The sensors 202 may provide both remote and local indications. The local indicator 210 may be hardwired to the microcontroller 206 via the connection 218. As illustrated in FIG. 2A, the microcontroller 206 is inside the enclosure 212. Alternatively, the communication between the microcontroller 206 and the local indicator 210 can be performed wirelessly. In an exemplary embodiment, the local indicator 210 is one or more light emitting diodes or any other suitable indicator.

Figure 4A:
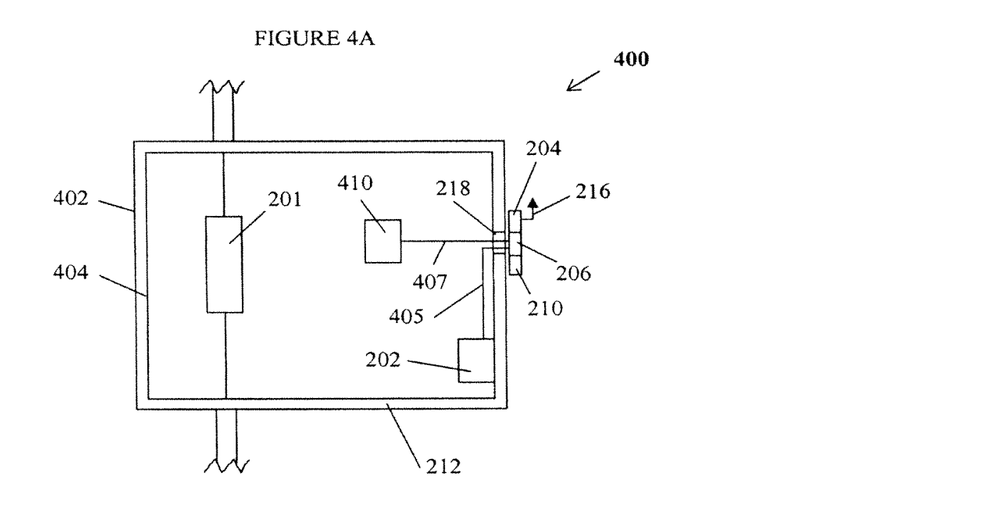
FIG. 4A is a block diagram depicting a sensor system installed for an explosion-proof enclosure for monitoring and controlling an electrical component and/or the component's surrounding environment according to an exemplary embodiment.

In an alternative exemplary embodiment, as illustrated in FIG. 4A, one or more of the sensors 202, the microcontroller 206, and the transceiver 204 can be provided on an exterior of the enclosure 212.

The sensors 202 may be used to monitor a component 201 in any suitable enclosure 212, such as, for example, a control panel, motor control, panelboard, junction box, terminal box, or any other suitable device. The enclosure 212 can be designed for a particular application, such as use in a hazardous, corrosive, wet, dusty, temperature sensitive, or other environment. Thus, the enclosure 212 may be subjected to, for example, temperature and/or humidity changes (relative humidity or "RH"), splashing, extreme temperatures, and/or hazardous, corrosive, dusty, or dirty conditions. Thus, the enclosure 212, including all attachments to or passages through the enclosure 212, can be designed to comply with the needs of any particular environment. For example, the enclosure 212 can be explosion proof, watertight, and/or water resistant. The enclosure 212 can be an entirely sealed enclosure or a partially open enclosure.

The microcontroller 206 may also be used for autonomous control of devices without the use of the central computer 102. A microcontroller 206 may receive information from a sensor 202 and make necessary corrective actions based on information received from the sensor 202. If a sensor 202 detects an event, the sensor 202 provides an indication to the microcontroller 206 that an event has occurred. If the microcontroller 206 receives an indication from the sensor 202 that an event has occurred, the microcontroller 206 communicates the indication to the transceiver 204, which in turn communicates that indication to a repeater 304 (FIG. 3) or the central computer 102 (FIG. 1). If the transceiver 204 is not within a range of communication with the repeater 304 (FIG. 3) or the central computer 102 (FIG. 1), the transceiver 204 may instead communicate the indication to the transceiver 208 of another sensor system 200, which then communicates the indication to the repeater 304 (FIG. 3) or the central computer 102 (FIG. 1). Alternatively, the microcontroller 206 may receive instructions from a central computer 102 and take action according to the received instructions.

Multiple sensors 202 may be employed to determine the status of various components 201. With reference to FIG. 1, a non-limiting list of such exemplary sensors include Emergency Lighting Battery Pack Health sensors 120, Enclosure Explosion Indication sensors 122, Conveyor Switch sensors 124 (for example, safety, alignment, proximity, disconnect, or other suitable switch sensors), Motion Detection Tracking sensors 126, Process Seal Rupture sensors 128, Panel or Individual Breaker Trip Indication sensors 130, Lighting Components Monitoring sensors 132, and Enclosure Moisture Indication sensors 134, each of which will be discussed in turn hereinafter.

One or more sensors 202 may be used in conjunction with the devices 204, 206, 210, and 216 illustrated in FIG. 2A. Accordingly, the devices 204, 206, 210, and 216 can provide processing and communications for multiple sensors within a single enclosure 212, if desired. For example, multiple components 201 may be included in or be coupled to the enclosure 212.

Emergency Lighting Battery Pack Health sensors 120 are one type of sensor 202 and monitor the charge status of a battery connected to an emergency light, as well as factors that may impact the battery's operation. The battery charging circuitry has temperature and timing sensors to monitor the status of the battery pack to ensure the batteries are not over charged, undercharged, severely discharged, or charged too rapidly. The sensors also detect and indicate when the batteries are fully charged and ready for use. The Emergency Lighting Battery Pack Health sensors 120 provide an indication to the microcontroller 206 for communication to the central computer 102 and/or the local indicator 210. When the Emergency Lighting Battery Pack Health sensors 120 provide an indication to the local indicator 210, the indication can be a green light for a healthy battery, a yellow light for a battery that is operational but has issues, and a red light for a non-operating battery. Alternatively, other types of indications can be used to indicate the status of the emergency battery without departing from the scope and spirit of the exemplary embodiment. The microcontroller 206 or the central computer 102 can provide corrective actions in the form of commencing diagnostic testing of the circuit to ensure proper battery operation. Other types of corrective actions can be provided, such as informing personnel for maintenance or replacement of the component, without departing from the scope and spirit of the exemplary embodiment.

Another sensor 202 is an Enclosure Explosion Indication sensor 122 capable of monitoring the environment within an explosion-proof enclosure to determine whether an explosion has occurred within the enclosure, without requiring the explosion-proof enclosure to be opened and visually inspected. Typically, after an explosion within an explosion-proof enclosure, the component can continue to operate without providing an external indication that an explosion has occurred. Various types of sensors can be used to detect such an explosion. For example, the sensor 122 can detect an internal explosion via a rapid temperature or pressure change. Upon detecting an internal explosion, the sensor 122 communicates the state change to the microcontroller 206 for communication to the central computer 102 and/or the local indicator 210. When the Enclosure Explosion Indication sensor 122 provides an indication to the local indicator 210, the indication can be a green light for a non-explosion state, a yellow light for a state where there is a potential for an explosion, and a red light for a state where an explosion has occurred. The microcontroller 206 or the central computer 102 can provide corrective actions in the form of informing personnel for maintenance or replacement of the component. Other types of corrective actions can be provided without departing from the scope and spirit of the exemplary embodiment. Explosion-proof sensors are disclosed in the following applications, U.S. application Ser. No. 12/193,094, entitled "Explosion Indicator for Explosion-Proof Enclosures," filed Aug. 18, 2008, U.S. application Ser. No. 12/123,063, entitled "Explosion Indicator for Explosion-Proof Enclosures," filed May 19, 2008, and U.S. application Ser. No. 11/960,904, entitled "Explosion Indicator for Use in Explosion-Proof Enclosures with Critical Equipment," filed Dec. 20, 2007, all of which are assigned to Cooper Technology Company and are incorporated by reference herein.

Two other forms of sensors 202 are the Switch sensor 124 and the Panel Breaker Trip Indication sensor 130, which monitor individual circuits or groups of circuits protected by switches or circuit breakers, respectively. In an exemplary embodiment, Trip/Switch sensors 124 and 130 are used. The Trip/Switch sensors 124 and 130 monitor the outputs of one or more circuits in a switch or circuit breaker to determine whether a change of state, for example, a loss in voltage or amperage, has occurred in the circuit. With regard to the Switch sensor 124, the sensor determines whether a loss in voltage occurred in the circuit due to a switch being open. With regard to the Trip sensor 130, the sensor determines whether a loss in the voltage occurred in the circuit due to a circuit breaker opening. The Trip/Switch sensors 124 and 130 are connected to the output of each circuit in the switch or circuit breaker to be monitored. If a sensor detects a loss in voltage in the circuit, the sensors 124 and 130 provide an indication to the microcontroller 206 that a loss in voltage has occurred, which then communicates this information to the central computer 102 and/or the local indicator 210. When the Trip/Switch sensors 124 and 130 provide an indication to the local indicator 210, the indication can be a green light for a closed state and a red light for an open state. Alternatively, other types of indications can be used to indicate the status of the switch or circuit breaker without departing from the scope and spirit of the exemplary embodiment. In certain exemplary embodiments, the microcontroller 206 or the central computer 102 can provide corrective actions in the form of operating a motor to close the switch or circuit breaker. Other types of corrective actions can be provided, such as informing personnel for maintenance or replacement of the component, without departing from the scope and spirit of the exemplary embodiment.

One type of Switch sensor 124 is a conveyor switch sensor. The conveyor switch sensor is a safety switch for personnel that work alongside a conveyor. The conveyor switch can operate when a person becomes entangled with the conveyor. The operation of the conveyor switch turns off the conveyor belt and sends an indication to the central computer 102 indicating that the conveyor switch has operated and also provides a location at which the conveyor switch operated. Once the central computer 102 receives the indication, the central computer 102 transmits the information to personnel 106 so that they can perform corrective actions 108. These corrective actions 108 include going to the location where the conveyor switch operated, determining what caused the operation of the conveyor switch, and manually resetting the conveyor switch once personnel has determined that it is safe to do so.

Another sensor 202 is a Motion Detection Tracking sensor 126. Multiple forms of motion detection racking sensors 126 are available, including, for example, time modulated ultra wideband ("TM-UWB") radars, image comparison, and infrared detection. TM-UWB radar transmits ultra wideband pulses that illuminate the building and/or the surrounding area. The radar receives signal returns, and the signal return data is processed to determine, among other things, whether an alarm condition has been triggered. Alternately, image comparison accepts video images from a plurality of camera modules. Specifically, video signals are input from the camera modules to a motion detection analysis module for prediction of a moving object in the images captured by the cameras. Images are input to the motion detection analysis module for correlation of the video images from the cameras to a reference map of the area under surveillance. Another form of motion detection available is Infrared. An infrared ("IR") sensor is configured to receive IR radiation focused from a lens. The IR sensor generates a sensor signal in response to motion across the field-of-view of the lens. A controller using a motion detector is responsive to the sensor signal so as to generate a switch signal.

Regardless of the form of motion detection used, the sensor determines whether an alarm condition has been triggered indicating an intrusion, and the sensor 126 reports detected movement to the microcontroller 206. The definition of an alarm condition can depend upon the particular environment in which the motion detection system is used. For example, in a home security environment, an alarm condition is triggered when a moving object approaches and penetrates a perimeter around the outside of the house or some other predetermined exterior boundary. Alternatively, in a building security environment, movement in a restricted area within the building triggers an alarm condition. Alarm conditions can vary, depending upon the exact environment in which motion detection system is installed and the types of motion that a user desires to be detected.

The Motion Detection Tracking sensor 126 can also be used as a belt alignment switch to detect movement of the conveyor out of its track or even detect movement of the conveyor before it goes out of its track. If the conveyor moves out of its track, the conveyor could cause extensive damage and also can hurt or kill people that are near the conveyor. Even if the conveyor remains in its track, the conveyor's movement from side to side can result in the conveyor belt tearing. Upon detecting conveyor movement beyond a desired threshold, the Motion Detection Tracking sensor 126 can send a signal to the microcontroller 206, which then communicates this information to the central computer 102 and/or the local indicator 210. The Motion Detection Tracking sensor 126 provides an indication that the conveyor is operating properly, the conveyor is on the track but is shifting side to side, or the conveyor is off the tracks. In certain exemplary embodiments, the microcontroller 206 or the central computer 102 can provide corrective actions in the form shutting down the conveyor and/or instructing personnel to go to the location where the signal originated, determining what caused the signal to be sent, and manually restarting the conveyor once personnel has determined that it is safe to do so.

Yet another sensor 202 is a Process Seal Rupture sensor 128, which monitors a conduit system of a pressure vessel having a series of seals. A primary seal is positioned at the point where the instrument or device mates with the pressure vessel. A secondary seal is positioned in the conduit system to contain a leak if the primary seal fails. The Process Seal Rupture sensor 128 is coupled between the primary seal and the secondary seal to detect a leak of the primary seal. The secondary seal allows the leaked material to be contained while still allowing Process Seal Rupture sensor 128 to provide indication to personnel that the primary seal has ruptured. In one example, the Process Seal Rupture sensor 128 can detect the rupture of a rupture disk in the primary seal by detecting material leaking from the primary seal. In another example, the Process Seal Rupture sensor 128 can detect the rupture of a rupture disk in the primary seal by detecting a change in pressure. A rupturing of the rupture disk can activate the Process Seal Rupture sensor 128, which in turn can transmit a signal to the microcontroller 206 to alert personnel or to cause a corrective action to occur, such as a shutdown of one or more pieces of equipment. The microcontroller 206 alerts personnel via transmitting a signal to the central computer 102 or the local indicator 210. The signal can indicate that the primary seal is operating properly or that the primary seal has ruptured. According to this embodiment, the Process Seal Rupture sensor 128 is within an enclosure, which for this type of sensor, is defined to be an area that is enclosed between to component fittings. Thus, the enclosure is defined to be the area enclosed between the primary seal and the secondary seal.

Another sensor 202 is the Lighting Component Monitoring sensor 132 that monitors and controls luminaries. The sensor 132 includes a Communicating Luminary Sensor located at each luminary and is able to sense and control power flow to each of the luminaries. The sensor is capable of interrupting power flow to the luminary. Additional features of the Communicating Luminary Sensor may include GPS chips for mapping applications, ground fault detection circuit, on/off time stamping including lamp burn time, temperature indication, temperature rise indication, dimming of the luminary, luminary fixture component health monitoring, and AC power/energy use, including AC current and AC voltage. In this exemplary embodiment, the sensor 132 can be located within the enclosure or adjacent to the enclosure. The sensor 132 provides an indication to the central computer 102 and/or the local indicator 210. When the sensor 132 provides an indication to the local indicator 210, the indication can be a green light for indicating that the component is functioning properly and a red light to indicate that the component is not operating. Alternatively, other types of indications can be used to indicate the status of the luminaire component without departing from the scope and spirit of the exemplary embodiment. In certain exemplary embodiments, the microcontroller 206 or the central computer 102 can provide corrective actions in the form of informing personnel for maintenance or replacement of the component.

Enclosure Moisture Indication sensor 134 is another form of sensor 202. In the event that a moisture elimination method (drains and breathers, space heater, desiccants, etc) within an enclosure are overloaded, fail, or nonexistent, a sensing and indication system is needed to alert maintenance or control room personnel that moisture buildup is occurring and could cause system malfunction, failure, shock or other loss of performance or safety hazard if conditions persist. Enclosure Moisture Indication sensor 134 can detect moisture in several ways. One example includes sensing the presence of elevated and/or changing humidity levels such that condensation will likely occur. This sensing can involve temperature and humidity monitoring to determine the relative humidity. Additionally or alternatively, the sensor 134 may sense the moisture build-up in the bottom of the enclosure to a predetermined threshold depth.

The sensor 134 may additionally allow for controlling the environment within the enclosure 212 by responding to monitored parameters falling outside an acceptable range and turning certain systems on or off to allow the parameters to return within the acceptable range, either automatically or by user interaction. One of the sensors 134 can measure the relative humidity within the enclosure 212. Another sensor 134 can monitor the presence of water at the base of the interior of the explosion-proof enclosure 212. This sensor may be a float sensor, an optical liquid level sensor, or any other sensor type capable of detecting water at the base of the interior of the explosion-proof enclosure 212. If a sensor 134 communicates a condition indicating moisture or water buildup in the enclosure 212, then the microcontroller 206 can activate a drain and/or a heater within the enclosure 212 to alleviate the problem. The microcontroller 206 can take such action automatically or based on information received from the central computer 102. Although some corrective actions have been provided as an example, other types of corrective actions can be provided by the central computer 102 or the microcontroller 206 without departing from the scope and spirit of the exemplary embodiment. The Enclosure Moisture Indication sensor 134 is described in further detail with respect to FIGS. 4A and 4B.

In an exemplary embodiment including an explosion proof enclosure 212, an explosion proof connector 218 may be installed to allow communication between the inside of the enclosure 212 and the outside of the enclosure 212. The explosion-proof connector 218 can be cylindrically shaped and may be fabricated from a metallic material or from a polymer material. The explosion-proof connector 218 is threaded such that when the connector 218 is threaded though the opening between the exterior side and the interior side of the explosion-proof enclosure 212, a seal is automatically formed between the threads of the connector. Other sealing means may also be used to accommodate alternative shapes that may be used for the explosion-proof connector.

Additional features may be provided in the enclosure 212. An example includes a GPS chip (not illustrated) for mapping a location of the enclosure 212. The GPS chip can communicate position information to the microcontroller 206 for communication to the central computer 102. Alternatively, an address can be programmed into the sensor and/or the microcontroller, and the address can be reported with the state information to the central computer 102. Also, additional power sensors (not shown) may be used to monitor power parameters, including consumption and current leakage.

Figure 2B:
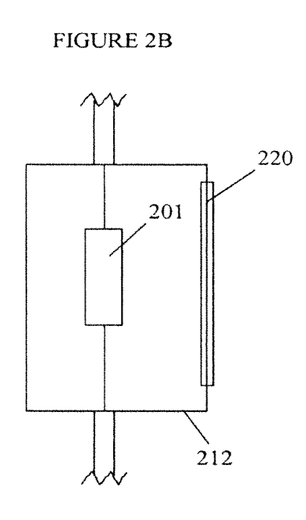
FIG. 2B is a block diagram depicting a preexisting component in an enclosure according to an exemplary embodiment.
Figure 2C:
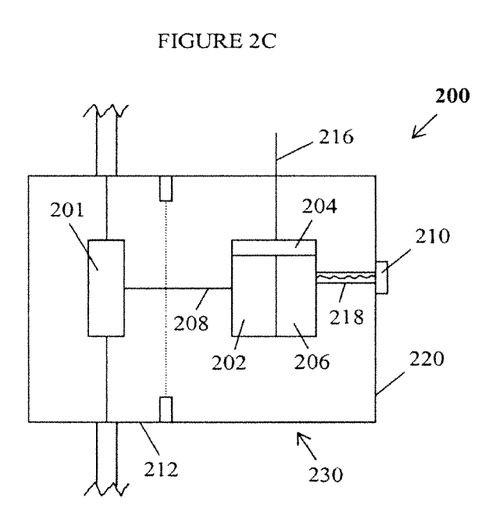
FIG. 2C is a block diagram depicting the preexisting component of FIG. 2B modified with a sensor module (including the components illustrated in FIG. 2A) to become a sensor system according to an exemplary embodiment.

An alternative embodiment allows alteration of an existing device with minimal alterations. FIG. 2B is a block diagram depicting a preexisting component 201 in an enclosure 212 according to an exemplary embodiment. Adjacent to component 201 is a panel or other opening 220 in the enclosure 212 that allows a user access to the component 201 as needed. FIG. 2C is a block diagram depicting the preexisting component 201 of FIG. 2B modified with a sensor module 230 (including the components illustrated in FIG. 2A) to become a sensor system 200 according to an exemplary embodiment. The coupling of the module 230 creates a larger enclosure that now includes the component 201 that is to be monitored/controlled, a sensor 202, a microcontroller 206, a transceiver 204, an antenna 208, and a local indicator 210. The component 201, the sensor 202, the microcontroller 206, and the transceiver 204 are positioned within the enclosure 212 according to this exemplary embodiment. The antenna 208 is located at least partially outside the enclosure 212 so that it can wirelessly transmit information to a central computer 102. The local indicator 210 is positioned outside of the enclosure 212 so that the status indication can be determined without having to open the enclosure. The resultant system 200 functions substantially the same was as previously disclosed embodiments. In alternative exemplary embodiments, one or more of the sensor 202, the microcontroller 206, and the transceiver 204 can be positioned outside of the enclosure.

In yet another alternative exemplary embodiment, the sensor 202, microcontroller 206, and transceiver 204 can be placed inside the original enclosure 212 without modification to the enclosure 212 by installing those items in an open space within the enclosure 212.

Figure 3:
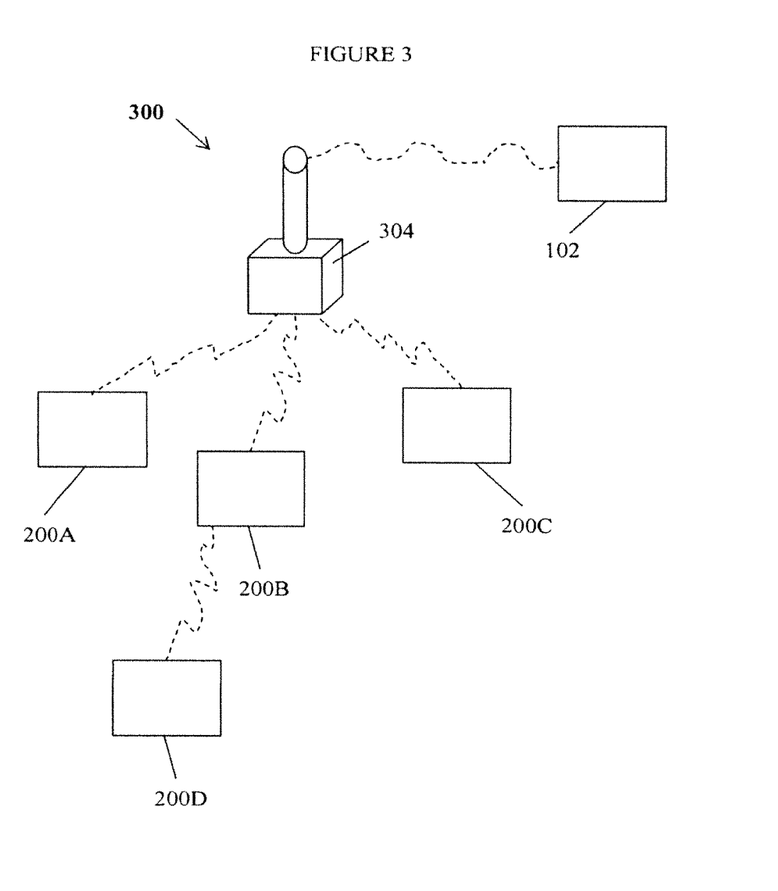
FIG. 3 is a block diagram depicting multiple sensor systems and a repeater communicating with a central computer according to an exemplary embodiment.

Once sensor information is collected by the sensor 202, the information can be transferred to a central location. FIG. 3 is a block diagram depicting multiple sensors systems 200A-D and a repeater 304 communicating with the central computer 102 according to an exemplary embodiment. In this exemplary embodiment, sensor systems 200A-C communicate directly with the repeater 304, which communicates with the central computer 102. Sensor system 200D is located at a distance where it is incapable of communicating with the repeater 304. Thus, sensor system 200D uses the transceiver of at least one of sensor systems 200A-C to communicate with repeater 304. In an alternative embodiment, one or more of the sensor systems 200A-D can communicate directly with the central computer 102 thereby bypassing or eliminating the need for repeater 304.

In an exemplary embodiment, the repeater 304 includes a transceiver to receive information from and transmit information to the sensor systems 200A-D, either directly or indirectly, and to receive information from and transmit information to the central computer 102. The information from the sensors systems 200A-D and repeater 304 is collected at the central computer 102. In an exemplary embodiment, each of the sensor systems 200A-D may be located inside or adjacent an enclosure 212 containing the component 201 under observation, and the repeater 304 can be located outside the enclosure 212 to transmit information to a central monitoring system, such as the central computer 102. Multiple alternative embodiments exist that function in a similar manner, including the repeater 304 being located inside the enclosures 212 of one or more of the sensor systems 200A-D.

In an exemplary embodiment, the repeater 304 is located outside the enclosure 212 containing the sensor 202 and the component 201 under observation. The transceiver 204 coupled to the microcontroller 206 of a sensor system 200A-D includes a two-way communication mode to send signals and/or to receive signals to the repeater 304. The wireless communication may be performed by RF technology, but the communications may be performed by other means as well. The microcontroller 206 processes the signal from the sensors 202 and determines whether any of the monitored parameters are outside an acceptable range. In response to any parameter being outside an acceptable range, the microcontroller 206 sends a signal to the repeater 304 to indicate a problem to the central computer 102. The microcontroller 206 also may report status information and/or current state information even in the absence of a problem reading. The signal may be sent by hardwire, wireless, or a combination of both.

Information collected by the sensors 202 is either displayed locally, transmitted directly to a central controller 102, or collected by a repeater 304 for transmission to a central computer 102. A repeater 304 may include a processor, a power supply, a transceiver, and a computer communication port. The processor, power supply, and transceiver may be similar to the corresponding components in the sensor systems 200. In an exemplary embodiment, the sensor system 200 and the repeater 304 may be combined and share components. The computer communication port can include any port through which the repeater 304 can communicate with the central computer, such as an antenna, a USB port, an Ethernet port, or other suitable port. The sensor system 200 then communicates that indication to the processor of the repeater 304, which in turn communicates that indication to the central computer 102 via the computer communication port.

The repeater 304 can be located at or near the sensor system 200 in an exemplary embodiment. The repeater 304 either polls the sensor system 200 directly for data, or receives periodic unsolicited status updates from the sensor system 200. This collected data may be maintained in a local memory in the repeater 304 for communication back to the central computer 102. Thus, the repeater 304 functions both as an onsite database for sensor data, as well as an ingress/egress point for the central computer 102 in an exemplary embodiment. The repeater 304 communicates to the central computer 102 via long haul communications, which may be almost any available commercial communications method, including but not limited to, telephony, cellular data modems, satellite, advanced metering infrastructure (AMI) backhaul networks, and radio networks.

Once information is received by the repeaters 304, the information is sent to the central computer 102 according to an exemplary embodiment. The central computer 102 includes a suite of server applications that receive and process collected data for alarming, maintenance, and display. The central computer 102 is capable of using long haul communications, whether polled or unsolicited, to communicate with one or more repeaters 304. Additional features of the central computer 102 may include collection of sensor data through the repeaters; management of the sensors; management of the repeater units; scheduling and configuration of sensors and repeaters; control of sensors, including on/off control of equipment and devices and scheduling control; providing alarms and alerts; reporting of age estimation and work orders based upon failure of circuits; inventory management including equipment information and location and service information; work order management; and mapping functions. Additionally, the central computer 102 may present information on any format, including but not limited to, a personal computer or the internet.

Information received by the computer is then processed by software 104 designed to interpret the information. The software 104 may be located in the central computer 102 or may be located in a separate computer or Internet based location, If the software 104 is separated from the central computer 102, the connection may be protected to prevent outside users accessing the information. The software 104 takes the information and interprets the information to monitor, track, prioritize, and alert users as needed. The software 104 used in the invention may also receive information from outside the invention. Transceivers 136 operating on available frequencies may also directly communicate with the software 104 to send and receive information per the exemplary embodiment.

Once the software 104 has processed the information, the information is then sent to end users or personnel 106 via communication to other computers, such as Internet communications using a website. Examples of personnel 106 include, but are not limited to, individuals directly involved in plant operations. These individuals could be at central locations or at a dedicated control room. Additionally, the central computer 102 may send the raw data to the plant operators or maintenance personnel. With the raw data, plant operators may then take necessary corrective action 108. Actions may include, but are not limited to, installation or maintenance of the sensors or the components or devices being monitored or controlled 108.

Additionally, the communications protocol may be updated as needed. Firmware used by the system will enable a wireless communication through an onboard radio to indicate the location of the sensor system 200 or repeaters 304, the affected component 201 number and name, and the time and trip/close/open condition. Mesh network or point to point communication may be used. Software for the base station (laptop and PDA) can demonstrate the functionality of the system. Consideration should also be given to this condition signal being sent via wireless or Ethernet to plant networks for maintenance operations.

FIG. 4A is a block diagram depicting a sensor system 400 installed for an explosion-proof enclosure 212 for monitoring and controlling an electrical component 201 and/or the component's 201 surrounding environment according to an exemplary embodiment. The sensor system 400 includes a sensor 202, a microcontroller 206, a transceiver 204, an antenna 216, and a local indicator 210. As an optional feature, the sensor system 400 also includes an environment controlling device 410.

The enclosure 212 is a rectangular shaped enclosure which is designed to be explosion proof. The enclosure 212 has an exterior surface 402 and an interior surface 404. Although the enclosure 212 is rectangular shaped, the enclosure 212 can be any geometric shape including, but not limited to, circular, square, or triangular, without departing from the scope and spirit of the exemplary embodiment. Also, although the enclosure 212 is designed to be explosion proof, the enclosure 212 can be any type of enclosure, not limited to being explosion proof, without departing from the scope and spirit of the exemplary embodiment. In certain exemplary embodiments, the enclosure 212 can include an area located between two or more component fittings, such as between two seals positioned along a vessel, without departing from the scope and spirit of the exemplary embodiment. According to this exemplary embodiment, the enclosure 212 contains the component 201, the sensor 202, and the environment controlling device 410. In alternative embodiments, one or more of the sensor 202, the microcontroller 206, the transceiver 204, and the environment controlling device 410 can be provided either within or coupled exteriorly to the enclosure 212.

The component 201 is an electrical switch or a circuit breaker which the enclosure 212 protects. The component 201 can be any type of electrical device without departing from the scope and spirit of the exemplary embodiment. The component 201 is configured to complete an electrical circuit (not shown).

In the exemplary embodiment, the environment controlling device 410 is positioned within the enclosure 212 and is designed to control the enclosure's 212 environment that surrounds the component 201. The environment controlling device 410 is a space heater. Although the environment controlling device 410 is shown to be a space heater in this exemplary embodiment, the environment controlling device 410 can be any other type of device designed to change environmental conditions within the enclosure 212, which can include, but is not limited to, a fan, a power drain, a device to unplug a clogged drain, and a dehumidifier. Although the environment controlling device 410 is shown to be positioned within the enclosure 212, alternative embodiments can have the environment controlling device 410 positioned exteriorly adjacent to the enclosure 212 without departing from the scope and spirit of the exemplary embodiment.

The sensor 202 is a humidity sensor that detects the relative humidity within the enclosure 212. In addition to the humidity sensor, the sensor 202 can also include a liquid level sensor that determines the liquid level at the base of the enclosure 212. The liquid level sensor can be any type of sensor designed to detect when the water level at the base of the enclosure 212 reaches a predetermined threshold, which includes, but is not limited to, a vertical float sensor, a horizontal float sensor, or an optical liquid-level sensor. Similarly, the humidity sensor can be any type of sensor designed to detect when the relative humidity level within the enclosure 212 goes beyond an acceptable predetermined range. Although two types of sensors are illustrated, there can be more or less sensors, as well as sensors that detect alternative environmental parameters and/or component parameters, without departing from the scope and spirit of the exemplary embodiment.

The sensor 202 is coupled to the microcontroller 206, which is located outside of the enclosure 212. According to this exemplary embodiment, the microcontroller 206 is coupled to the sensor 202 using a hardwire 405 that goes through an explosion-proof connector 218. Explosion-proof connector 218 provides a passageway between the exterior surface 402 and the interior surface 404 of the enclosure 212. As previously discussed, the explosion-proof connector 218 can be cylindrically shaped and is fabricated from a metallic material or from a polymer material. The explosion-proof connector 218 is threaded such that when the connector 218 is threaded though an opening between the exterior surface 402 and the interior surface 404 of the explosion-proof enclosure 212, a seal is automatically formed between the threads of the connector 218. Other sealing means may also be used to accommodate alternative shapes that may be used for the explosion-proof connector 218. In alternative exemplary embodiments, the microcontroller 206 can be coupled to the sensor 202 wirelessly. Still in other exemplary embodiments, the microcontroller 206 can be positioned within the enclosure 212 without departing from the scope and spirit of the exemplary embodiment. In yet other alternative exemplary embodiments, the microcontroller 206 can be omitted such that the analysis of the information occurs at or through the central computer 102 (FIG. 1).

The microcontroller 206 includes software to analyze the information received by the sensor 202. In this embodiment, the software determines whether the relative humidity surrounding the component 201 is within an acceptable range, whether the relative humidity surrounding the component 201 is beyond an acceptable range, and whether the liquid level has formed at the base of the enclosure 212 and has reached a predetermined threshold level. Upon the microcontroller 206 performing its analysis on the information received from the sensor 202, the microcontroller sends the information to the transceiver 204 and/or the local indicator 210.

According to the exemplary embodiment, the local indicator 210 includes one or more indicators to represent a status condition of the parameter being monitored. The local indicator 210 is positioned outside of the enclosure 212 so that personnel can determine the status of a measure parameter without opening the enclosure 212. In this embodiment, the local indicator includes three light emitting diodes ("LEDs"), where a lit green LED indicates that the relative humidity surrounding the component 201 is within an acceptable range, a lit yellow LED indicates that the relative humidity surrounding the component 201 is beyond an acceptable range, and a lit red LED indicates that the liquid level has formed at the base of the enclosure 212 and has reached a predetermined threshold level. Although three LEDs are used to indicate the status of a measured parameter, more or less LEDs can be used to indicate different status indications. Additionally, although LEDs are used to indicate the status of a measure parameter, other visual or audible indications can be used without departing from the scope and spirit of the exemplary embodiment.

The transceiver 204 is positioned exterior of the enclosure 212 and adjacent the microcontroller 206. The transceiver 204 receives information from the microcontroller 206 and transmits the information to the central computer 102 (FIG. 1) using the antenna 216, which is also positioned exterior to the enclosure 212 and coupled to the transceiver 204. In alternative embodiments, the transceiver 204 can be positioned within the enclosure 212 without departing from the scope and spirit of the exemplary embodiment. According to this embodiment, the transceiver is a two-way communication device that receives information from the microcontroller 206 and transmits the information to the central computer 102 (FIG. 1) and also receives information from the central computer 102 (FIG. 1) and transmits the information to the microcontroller 206. In alternative exemplary embodiments, the transceiver may be a one-way communication device that receives information from a sensor 202 and transmits the information to the central computer 102 (FIG. 1). The transmission of the information from the transceiver 204 to the central computer 102 (FIG. 1) and from the central computer 102 (FIG. 1) to the transceiver 204 has previously been described.

The antenna 216 is an external antenna. However, in alternative exemplary embodiments, the antenna 216 can be any other type of antenna including, but not limited to, printed circuit traces or chip antennas.

Once information is received by the central computer 102 (as shown in FIG. 1), the central computer can communicate a signal to notify personnel to perform corrective actions. Alternatively, the central computer can communicate a signal back to the transceiver 204 and/or microprocessor 206 to further send instructions to the environment controlling device 410 using hardwire 407. The instructions can signal the environment controlling device 410 to either turn on or turn off to assist in automatically restoring the surround environment back to proper levels. In some exemplary embodiment, the microcontroller 206 performs the analysis and provides the instructions to the environment controlling device 410 to either turn on or turn off. In these exemplary embodiments, a signal may or may not be sent to the central computer 102, thereby allowing some embodiments to reduce the information traffic to and from the central computer 102. A signal is sent to the central computer 102 when the surrounding environment conditions do not improve after a preset determined time period.

Although the exemplary embodiment described with respect to FIG. 4A uses a switch or circuit breaker as the component 201, other components can be used in lieu of the switch or circuit breaker without departing from the scope and spirit of the exemplary embodiment. Although the exemplary embodiment describes the enclosure 212 being an explosion-proof enclosure, other types of enclosures can be used without departing from the scope and spirit of the exemplary embodiment. Additionally, although the exemplary embodiment uses a humidity sensor and a liquid level sensor as the sensor 202, other types of sensors can be used in lieu of the humidity sensor and a liquid level sensor without departing from the scope and spirit of the exemplary embodiment. Moreover, although one configuration has been provided for the sensor system 400, other configurations can be designed, for example, placing certain components internal or external of the enclosure 212 without departing from the scope and spirit of the exemplary embodiment.

Figure 4B:
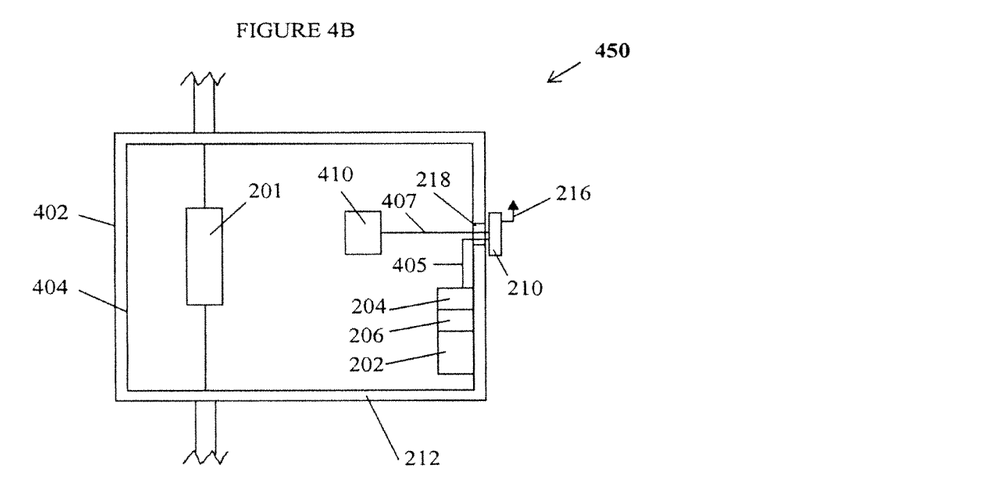
FIG. 4B is a block diagram depicting a sensor system installed for an explosion-proof enclosure for monitoring and controlling an electrical component and/or the component's surrounding environment according to another exemplary embodiment.

FIG. 4B is a block diagram depicting a sensor system 450 installed for an explosion-proof enclosure 212 for monitoring and controlling an electrical component 201 and/or the component's 201 surrounding environment according to another exemplary embodiment. This exemplary embodiment is similar to the exemplary embodiment described with respect to FIG. 4A, except that the microcontroller 206 and the transceiver 204 are both positioned within the explosion-proof enclosure 212.

Therefore, the presently disclosed apparatus is well adapted to attain the ends and advantages mentioned as well as those that are inherent therein. The particular embodiments disclosed above are illustrative only, as the presently disclosed apparatus may be modified and practiced in different but equivalent manners apparent to those having ordinary skill in the art and having the benefit of the teachings herein. Having described some exemplary embodiments of the presently disclosed invention, various modifications are within the purview of those having ordinary skill in the art without departing from the scope and spirit of the invention. While numerous changes may be made by those having ordinary skill in the art, such changes are encompassed within the spirit of the disclosed apparatus. Furthermore, no limitations are intended to the details of construction or design herein illustrated. It is therefore evident that the particular exemplary embodiments disclosed above may be altered or modified and all such variations are considered within the scope and spirit of the present disclosed invention.

What is claimed is:

1. A monitoring system for an electrical component, comprising:
a sealed electrical enclosure;
an electrical component disposed within the sealed electrical enclosure;
one or more sensors disposed within the sealed electrical enclosure, wherein the one or more sensors monitor a status of the electrical component or an environment within the sealed electrical enclosure and surrounding the electrical component, wherein the one or more sensors generate a first signal indicating the status;
a transceiver communicably coupled to the sensor, wherein the transceiver receives the first signal from the sensor; and
a central computer located at a remote location from the sealed electrical enclosure, wherein the central computer receives the first signal from the transceiver, wherein the central computer processes the first signal and sends a corrective action signal to the transceiver to instruct a device to change the status of the electrical component or the environment within the sealed electrical enclosure and surrounding the electrical component when the status is determined to be improper.

2. The monitoring system of claim 1, further comprising a microcontroller, wherein the transceiver is communicably coupled to the sensor through the microcontroller, and wherein the microcontroller allows the transceiver to send the first signal to the central computer only when the status of the electrical component or the environment within the sealed electrical enclosure and surrounding the electrical component is determined to be improper.

3. The monitoring system of claim 2, wherein the microcontroller is enclosed within the enclosure.

4. The monitoring system of claim 1, wherein the central computer wirelessly receives the first signal from the transceiver.

5. The monitoring system of claim 1, further comprising a local indicator located outside the enclosure, the local indicator communicably coupled to the sensor, the local indicator providing a status of the electrical component or the environment within the sealed electrical enclosure and surrounding the electrical component to an observer without the observer having to open the enclosure.

6. The monitoring system of claim 5, wherein the local indicator comprises one or more light indicators to indicate one or more different statuses of the electrical component or the environment within the sealed electrical enclosure and surrounding the electrical component.

7. The monitoring system of claim 5, wherein the one or more different statuses comprise a proper operating status, a warning operating status, and a critical operational status.

8. The monitoring system of claim 1, wherein the one or more sensors include one or more sensors selected from a group consisting of an emergency lighting battery pack health sensor, an enclosure explosion indication sensor, a conveyor switch sensor, a motion detection tracking sensor, a process seal rupture sensor, a panel breaker trip indication sensor, a lighting components monitoring sensor, and an enclosure moisture indication sensor.

9. The monitoring system of claim 1, wherein the central computer alerts a user to the status of the electrical component or the environment within the sealed electrical enclosure and surrounding the electrical component.

10. The monitoring system of claim 1, wherein the central computer indirectly receives the first signal from the transceiver using a repeater unit.

11. A monitoring system for an electrical component, comprising:
an electrical enclosure;
an electrical component enclosed within the electrical enclosure;
one or more sensors enclosed within the electrical enclosure, wherein the one or more sensors monitor a status of the electrical component or an environment within the sealed electrical enclosure and surrounding the electrical component, wherein the one or more sensors generate a first signal indicating the status;
a microcontroller coupled to the sensor, the microcontroller receives the first signal from the sensor and performs an analysis of the first signal to determine the status, wherein the microcontroller sends a corrective action signal to a device to instruct the device to change the status of the electrical component or the environment within the sealed electrical enclosure and surrounding the electrical component when the status is determined to be improper;
a transceiver communicably coupled to the microcontroller, wherein the transceiver receives the first signal from the microprocessor; and
a central computer located at a remote location from the electrical component, wherein the central computer receives the first signal from the transceiver.

12. The monitoring system of claim 11, further comprising a local indicator located outside the enclosure, the local indicator communicably coupled to the sensor, the local indicator providing a status of the electrical component or the environment within the sealed electrical enclosure and surrounding the electrical component to an observer without the observer having to open the enclosure.

13. A monitoring system for an electrical component, comprising:
an explosion-proof enclosure;
an electrical component enclosed within the explosion-proof enclosure;
one or more sensors enclosed within the electrical enclosure, wherein the one or more sensors monitor a status of a surrounding environment of the electrical component, wherein the one or more sensors generate a first signal indicating the status;
a transceiver communicably coupled to the sensor, wherein the transceiver receives the first signal from the sensor; and
a central computer located at a remote location from the electrical component, wherein the central computer receives the first signal from the transceiver, and wherein the central computer alerts a user of the status of the surrounding environment of the electrical component.

14. The monitoring system of claim 13, wherein the central computer processes the first signal and sends a corrective action signal to the transceiver to instruct a device to change the status of the surrounding environment of the electrical component when the status is determined to be improper.

15. The monitoring system of claim 14, wherein the device is selected from a group consisting of a fan, a heater, and a drain opener.

16. The monitoring system of claim 13, further comprising a local indicator located outside the enclosure, the local indicator communicably coupled to the sensor through a connector proceeding from the interior of the explosion-proof enclosure to the exterior of the explosion-proof enclosure, the local indicator providing a status of the surrounding environment of the electrical component to an observer without the observer having to open the enclosure.

17. The monitoring system of claim 16, wherein the local indicator comprises one or more light indicators to indicate one or more different statuses of the surrounding environment of the electrical component.

18. The monitoring system of claim 17, wherein the one or more different statuses comprise a proper operating status, a presence of abnormal humidity status, and a presence of condensation status.

19. The monitoring system of claim 13, wherein the one or more sensors include one or more of a humidity sensor and a liquid level sensor.

* * * * *